Feb. 4, 1969 J. H. MAYO 3,425,661

PLUG VALVE

Filed Jan. 24, 1967

INVENTOR.
JOHN H. MAYO,
BY
Kimmel, Crowell & Weaver.
ATTORNEYS.

Feb. 4, 1969

J. H. MAYO

3,425,661

PLUG VALVE

Filed Jan. 24, 1967

INVENTOR.
JOHN H. MAYO,
BY
Kimmel, Crowell & Weaver
ATTORNEYS.

United States Patent Office 3,425,661
Patented Feb. 4, 1969

3,425,661
PLUG VALVE
John H. Mayo, Houma, La., assignor to Mayo Valve
 Corporation, Houma, La., a corporation of
 Louisiana
Filed Jan. 24, 1967, Ser. No. 611,352
U.S. Cl. 251—175
Int. Cl. F16k 5/14, 39/06, 25/00
20 Claims

ABSTRACT OF THE DISCLOSURE

A plug valve assembly having floating gates and fluid pressure sealing means to prevent introduction of foreign material into the valve body to prevent abrasive wear on valve elements having surface-to-surface contact.

BACKGROUND OF INVENTION

This invention relates to the valving art and, more specifically, the invention pertains to the provision of a plug valve.

One of the primary objects of this invention is to provide balanced and unbalanced plug valves all of which are constructed on common operating tenents which, in practice, gives rise to an improved valve for fluid control from the standpoint of maintenance, ease of operation, interchangeability of components for handling differing fluids, and the ready adaptability of the valve in existing fluid lines as well as those being presently engineered.

It will be recognized, by those skilled in this art, that the present invention constitutes an improvement over my patent of the same title, No. 3,239,190, filed Mar. 26, 1963, Ser. No. 268,078, and which issued on Mar. 8, 1966. As such, the same advantages and objects there sought and achieved are common to this invention and require no recapitulation. But in addition thereto it is a further prime object of this invention to improve over the valve of the named patent, and over other related prior art valves, by providing, among other features of this invention, compressible means between the edges of the two gate components to close the gap between the gates and, in effect, to connect the stem and gates as a unit without voids. The compressible means serve, in this capacity, as a low pressure seal between the outside diameter of the gates and the inside diameter of the valve seats.

Another object of this invention is to provide a simple seat construction with appropriate seals and wherein the seat elements are removably secured in the valve body by non-complex wedge means in order to facilitate valve repair and replacement of the seats.

This invention contemplates, as yet another object thereof, the provision of a plug valve which is non-complex in construction and assembly, inexpensive to manufacture and maintain, and which is rugged and durable in use.

Other and further objects and advantages of the instant invention will become more manifest from a consideration of the specification to follow when read in conjunction with the annexed drawings.

SPECIFICATION

Referring now more specifically to FIGURES 1 to 5, inclusive, of the drawings which illustrate a first embodiment of this invention, reference numeral 20 designates a plug valve constructed in accordance with the teachings of this invention. The plug valve 20 is seen to comprise an elongated substantially rectangular main body portion 22 from one end 24 of which projects longitudinally and integrally connected first boss 26, and from its opposed end 28 extends an integrally formed elongated second boss 30. The main body portion is formed with a centrally located vertical bore 32, as viewed in FIGURE 1, which opens at its lower end into the upper end of a first counterbore 34, the latter being closed at its opposed lower end by a transversely extending end closure wall 36 integrally formed with the main body portion 22. The upper end of the central bore 32 opens into the lower end of a second counterbore 38, and the opposed other or upper end of the second counterbore 38 opens into the plane of the upper end 40 of the main body portion 22.

To serve function to be described infra, the central bore 32 is formed with an axially extending keyway 42 (see FIGURES 2, 3 and 4) which, at its upper end opens into the lower end of the second counterbore 38, the lower end of the keyway 42 terminating intermediate the ends of the central bore 32 as in the shoulder 44; and the end closure wall 36 is provided with a transversely extending cylindrical opening 46 which, at its upper end is in open communication with the lower end of the first counterbore 34, and the other end of the opening 46 opens into the plan of the lower end 48 of the main body portion 22 which is, of course, the exterior side of the end closure wall 36.

It is to be here understood that the central bore 32, the counterbore 34, 38, and the cylindrical opening 46 are in coaxial alignment, one with another.

The main body portion 22, intermediate the upper and lower ends of the central bore 32 is formed (see FIGURE 1) with an elongated traversing bore here generally designated by the reference numeral 50 and which, for convenience, is further defined as comprising the coaxially aligned passages 50A, 50B which open at a pair of adjacent ends into the central bore 32 at diametrically opposed sides thereof, and with their respective other ends diverging away from one another.

Figures 1, 2:
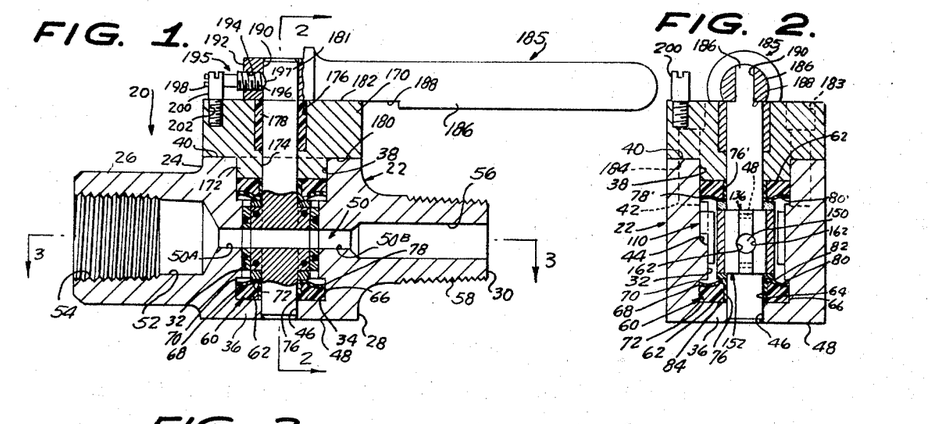
FIGURE 1 is a longitudinal medial transverse cross-sectional view of a plug valve constructed in accordance with this invention, the figure showing the valve as being open, and illustrating one plug valve embodiment of this invention.
FIGURE 2 is a vertical transverse cross-sectional view,
FIGURE 2 being taken substantially on the vertical plane of line 2—2 of FIGURE 1 looking in the direction of the arrows.
Figures 3, 4, 5:
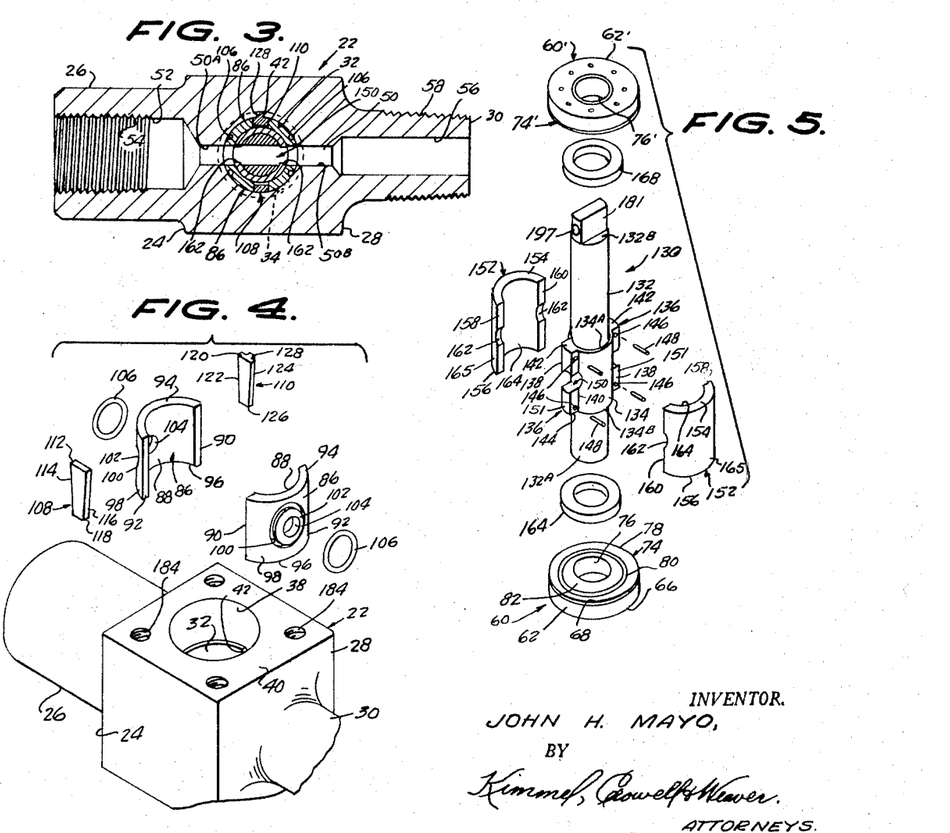
FIGURE 3 is a detail cross-sectional view, FIGURE 3 being taken substantially on the horizontal plane of line 3—3 of FIGURE 1, looking in the direction of the arrows.
FIGURE 4 is an exploded perspective view of the main body portion of the valve of FIGURE 1 and including a showing of the seat assembly therefor.
FIGURE 5 is an exploded perspective view of the valve stem assembly.

As is seen in FIGURES 1 and 3, the aforementioned end of the passage 50A opens into the inner end of a third counterbore 52 formed in the first boss 26, the third counterbore 52 being internally threaded at its opposed outer end, as at 54, to provide connecting means for one side of the valve 20 to one end of the fluid line (not shown) in which the valve 20 is to be connected.

With continuing reference to FIGURES 1 and 3 of the drawings, the above-mentioned other end of the passage 50B is seen to be in open communication with a fourth counterbore 56 formed in the second boss 30, and as is shown in these figures, the second boss 30 is externally threaded, as indicated by reference numeral 58, to provide means for coupling the other side of the valve 20 in the fluid line.

Referring now to FIGURES 1, 2 and 5, reference numeral 60 denotes a first compound gasket or seal assembly which includes as a first component an annular base member 62 formed of any suitable plastic material, "Buna-N," for example, having a coaxial transverse opening 64. One side (the lower side as shown in the several figures of the drawings) of the base member 62 is planar as is indicated at 66, while the opposed (upper) side 68 is formed with an upwardly opening concentrically located and inwardly extending preformed groove 70 giving rise, at the inner side thereof, to a concentric convex shoulder 72.

As its second component, the assembly 60 further includes a flanged sleeve liner element 74 formed of "Teflon" material which comprises a preformed hollow elongated cylindrical sleeve 76 from an end (upper) of which laterally projects a substantially cylindrical flange 78. The sleeve 76 is tightly inserted within the opening 64 of the annular base member 62, and the flange 78 is convoluted to form a first concave-convex outer portion 80 which fits or nests within the groove 70 and a raised inner concave-convex portion 82 superimposed on the shoulder 72, the concave side of the portion 82 receiving the shoulder 72 therein and tightly fitting or nesting thereover to form a corresponding raised shoulder. The cylindrical flange 76 is congruent with respect to the annular base member 62.

As is seen in FIGURES 1 and 2, the assembly 60 is seated in the first counterbore 34 occupying the same with the planar side 66 of the annular base member 60 engaging flush against the adjacent inner (upper) planar end 84 of the end closure wall 36.

Fitted within the central bore 32 and in surface-to-surface engagement therewith is a pair of diametrically opposed axially elongated substantially identically constructed arcuate insert plates or seats 86. Each plate or seat 86 has an arcuate length of less than 180° and is arranged and disposed within the central bore 32 in such a manner that their respective concave sides 88 are juxtaposed relative to one another. In FIGURE 4 of the drawings, the insert plates or seats are shown as having planar edges 90, 92 which inclined outwardly and downwardly from the planes of the upper ends 94 of the insert plates or seats 86 to the planes of their respective lower ends 96.

Each insert plate or seat 86, substantially centrally thereof and on the concave side 98 of each, is formed with an endless circular inwardly extending channel 100 defining thereby a concentric integrally formed cylindrical throat 102. Each throat 102 is coaxially bored to form hollow cylindrical passageways 104, and each throat 102 is encompassed by a "Teflon" annular O-ring seal 106 disposed in its respective associated channel 100.

The insert plates or seats 86 when disposed in the central bore 32 are arranged so that the outer ends of the throats 102 engage, respectively, the circumferential marginal edge of the aforementioned adjacent ends of the passages 50A and 50B, and with the passageways 104 coaxially aligned therewith. The insert plates or seats 86 are held in their respective above-described positions by means of a pair of wedges here generally indicated by reference numerals 108 and 110, respectively. The wedge 108 (see FIGURE 4) has a trapezodial configuration which includes the upper end 112 from which downwardly and inwardly converge the opposed edges 114, 116 thereof towards a lower end 118. The wedge 110 is similarly constructed, having an upper end 120 from which downwardly and inwardly converge the opposed side edges 122, 124 towards its lower end 126. This wedge 110 differs from the wedge 108 in that the wedge 110 is also formed with an elongated outwardly projecting substantially rectangular key 128 serving a function to be described.

In the assembly shown in FIGURES 2 and 3, the wedges are tapped into place with the wedge 108 extending between a pair of confronting adjacent edges 90, 92 of the seats 86 at that side of the central bore 32 confronting the keyway 42, and the wedge 110 is interposed between the other confronting adjacent edges 90, 92 and tapped into place. In the latter case, however, the key 128 is slidably received in the keyway 42. Suitable tools (not shown) may be extended through the second counterbore 38 and through the cylindrical opening 46 and proximate sleeve 76 to tap the wedges 108, 110 into place to effect both the assembly and disassembly of the seats 86 in the main body portion 22.

It is important to here note that the material of the annular O-ring seals 106 is slightly in excess of the capacity of the grooves 100 so that there results in a slight protuberance of material out of the grooves during the assembly of the seats 86. However, the construction is such that upon installation of the seats 86 the seals 106 are compressed to substantially fill but not overflow their grooves 100 to the extent that surface-to-surface contact between the convex sides of the seats 86 with the adjacent and confronting concave sides of the central bore 22 is prevented. The purpose of these annular seals 106 is to provide a low pressure initial seal and to provide a back-thrust to keep the wedges 108, 110 secure.

A balanced valve plug assembly according to this invention is generally denoted by reference numeral 130 and is seen to include an elongated substantially solid cylindrical stem 132 (see FIGURE 5) of uniform transverse cross-section throughout its length and which is machined or otherwise formed to provide an axially elongated coaxial enlarged smooth cylindrical shank 134 intermediate the opposed ends of the stem 132, the shank 134 having opposed planer ends 134A, 134B respectively. At diametrically opposed sides, the shank 134 is integrally formed with radially and outwardly diverging substantially rectangular axially elongated flanges 136 of identical construction.

Each flange 136 includes opposed edges 138, 140, and each flange 136, adjacent to but spaced inwardly from its opposed ends 142, 144, is formed with a bore 146, the bores 146 extending perpendicular to the longitudinal axis of its respective flange and at each end opening into the plane of the opposed edges 138, 140. To serve a function to be described below, each of the bores 146 receives an axially elongated substantially cylindrical rod 148 formed of "nylon" which seat therein with their respective ends projecting slightly beyond the planes of the adjacent edges 138, 140.

The flanges 136, shank 134 and stem 132 are formed with a continuous cylindrical fluid passage 150 which opens at its opposed ends into the planes of the remotely disposed outer curvilinear sides 151 of the flanges 136 and, as is seen in FIGURES 3 and 5, the diameter of the fluid passage 150 is greater than the distance between the edges 138, 140, so that the fluid passage 150 also opens therein.

The valve plug assembly 130 comprises, as further components thereof, a pair of concave-convex axially elongated floating gates 152 each having an arcuate length of less than 180° and being of identical construction. These gates are non-complex in manufacture, each having opposed planar ends 154, 156, coplanar with the ends 134A, 134B, respectively, of the shank 134, and planar edges 158, 160. Each edge 158, 160 intermediate the ends 134, 156 of each of the gates 152 is formed with an arcuate cutout 162 located at the ends of a cord extending between the edges 158, 160. For the purposes of description, the concave and convex sides of the gates 152 are here assigned identification numerals 164, 165, respectively.

The gates 152 are superimposed on opposite sides of the shank 134 with the concave side 164 thereof fitting flush thereagainst, and with the opposed ends 154, 156 thereof being coplanar with the adjacent ends 134A, 142 and 134B, 144, respectively, of the shank 134 and flanges 136. The edges 158, 160 of the gates 152 are juxtaposed relative to the adjacent edges 138, 140 of the flanges 136 to engage and compress the adjacent ends of the resilient rod 148 to serve a function to be described, and the cutouts 162 match the bored openings in the edges 138, 140 of the flanges 136 to complete the cylindrical fluid passage 150.

Telescoped over the lower end 132A of the stem 132 and fitting flush against the coplanar ends 134B, 144, 156 of the shank 130, flanges 136 and gates 152, respectively, is a first annular thrust bearing 166 to which further reference will be made below, and a second similar annular thrust bearing 168 is telescoped over the opposed upper end 132B, the latter fitting flush against the coplanar ends 134A, 142 and 154 of the aforementioned shank 134, flanges 136 and gates 152, respectively.

Projecting longitudinally from the outer terminus of the upper end 132B of the stem 132 is a diametrically extending tongue or wrench head 169 in one edge 170 of which is formed a socket 172, the function of the latter to be described as this specification progresses.

The above described plug assembly 130 is inserted in the main body portion 22 of the valve 20, and through reference to the specifically mentioned several figures of the drawings, it is seen that the lower end 132A of the stem 132 is rotatably journaled in the cylindrical opening 46 and the sleeve 76. The first annular thrust bearing 166 seats on the raised shoulder 82 and, of course, the convex outer side 165 of the gates 152 telescopically and slidably nest in coplanar relation relative to the adjacent concave sides 164 of the seats 152.

The upper end 132B of the stem 132 is of such length as to extend above the upper end 40 of the main body portion 22 and telescopically receives thereover a second compound gasket or seal assembly 60′ identically constructed with respect to the assembly 60 but inverted with respect thereto. The elements of this second assembly 60′ finding their equivalents in the first assembly 60 carry the same assigned reference numerals but primed to effect a differentiation therebetween.

Thus it is seen that the shoulder 82′ bears against the second annular thrust bearing 168 and is disposed in the second counterbore 38. The upper end 132B of the stem 132 is journaled for rotation in the sleeve 76′.

Reference numeral 170 designates a valve cap having a substantially rectangular configuration. The cap 170 is of such size as to be congruent with the upper end 40 of the main body portion 22 when seated thereon in its operative position. The cap 170 is formed with an integrally connected centrally located cylindrical neck 172, and is cylindrically bored and coaxially counterbored at 174, 176, respectively. Fitted in the counterbore 176 is a hollow cylindrical bushing 178.

With the cap 170 mounted as shown in FIGURE 1, the planar underside 180 thereof becomes coplanar with the end 40, the upper end 132B of the stem 132 extending through and being journaled for rotation in the bore 174 and bushing 178. The length of the upper end 132B of the stem 132 is such that a tongue 181 thereof extends above the plane of the upper side 182 of the cap 170, and any conventional means such as bolts 183 may be employed to effect a releasable connection between the cap 170 and the main body portion 22, the bolts 181 extending through the cap 170 for threading connection with the internally threaded opening 184 formed in the main body portion 22.

At 185 is indicated handle means, in general. The handle means 185 comprises an elongated substantially cylindrical lever 186 having, as is seen in FIGURE 1, an undercut planar recess 186 formed therein and extending axially thereof. The handle means 185 is further provided with a diametrically extending substantially rectangular slot 190 adjacent an end 192 thereof, and a tapped opening 194, is formed therein which, at its inner end, is in open communication with the slot 190.

The slot 190 receives the tongue 181 with the undercut recess 188 receiving the upper end of the cap 170 therein, and the handle means 185 is releasably connected to the tongue 181 by means of an elongated set screw 195 having an inner end 196 threaded into the opening 194 formed in the end 192 and received within the socket 197 provided in the tongue 181. The other or outer end 198 of the set screw 195 is of such length as to engage the upper end of an abutment bolt 200 disposed in its path of travel in one direction, the inner end of the bolt 200 being threaded into a tapped opening 202 extending inwardly from the upper end of the cap 170. The relative positions of the end 198 of the set screw 195 and the bolt 200 is such that they engage one another when the handle means 185 is turned to fully open the valve 20, the component elements thereof being in their respective positions as shown in FIGURES 1, 2 and 3 under this operative condition. In this operative position, the passage 50 and the fluid passage 150 are aligned and the valve 20 is open. Upon the turning of the handle means 185, 90° from the position shown in the last named figures, the fluid passage 150 is turned the same arcuate distance to position the gates 152 across the adjacent ends of the passageways 104 thereby closing the valve 20 and positioning the component elements thereof in their respective second operative positions.

Certain advantages and improvements result from the construction of the above described valve 20. For example, the rods 148 serve as a low pressure seal between the outside diameter of the gates 152 and the inside diameter of the seats 86, and the seating arrangement described supra serves to prevent any foreign matter from entering between the seats 86 and adjacent portions of the central bore 32 to effect damage to the valve 20, this latter feature is accomplished by the arrangement wherein the seats 86 are in their respective sealed positions at all times with the gates 152 floating to effect the sealing.

Again, the seats 86 (and if necessary, the gates 152) may be made of different compositions and are interchangeable depending on the intended use of the valve 20. Further, and with respect to the construction of the valve 20, it will be appreciated that the valve 20 may be easily repaired and the seats 86 and the gates 152 as well as the plug assembly 130 may be removed from the main body portion 22 without removing the same from its installation.

Figure 6:
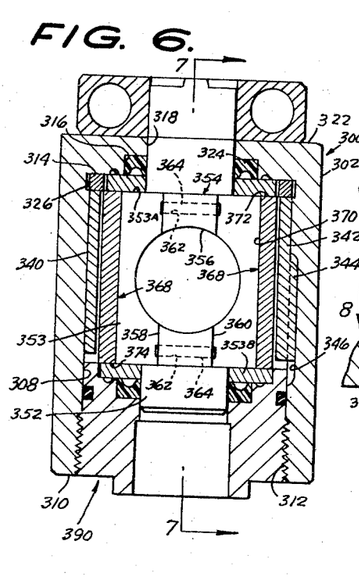
FIGURE 6 is a transverse medial cross-sectional view of a second embodiment of the plug valve according to this invention.
Figure 7:
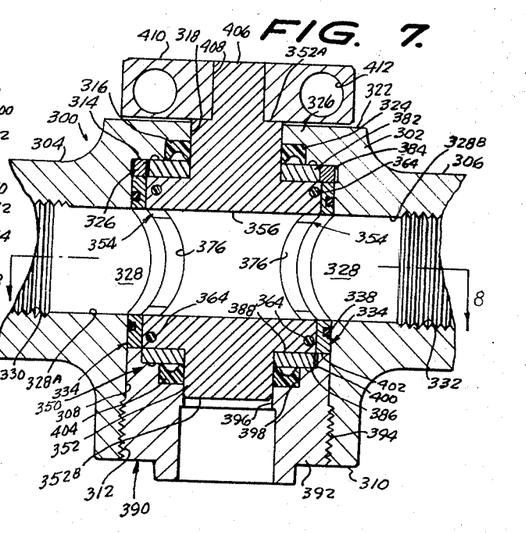
FIGURE 7 is a longitudinal medial cross-sectional view, FIGURE 7 being taken substantially on the vertical plane of line 7—7 of FIGURE 6, looking in the direction of the arrows.
Figure 8:
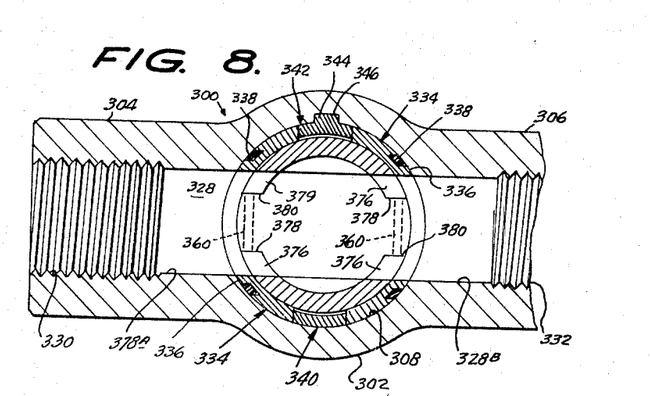
FIGURE 8 is a longitudinal detail cross-sectional view, FIGURE 8 being taken substantially on the horizontal plane of line 8—8 of FIGURE 7, looking in the direction of the arrows.

FIGURES 6 to 8, inclusive, illustrate a second embodiment of this invention wherein the major features of the inventive concept of the embodiment of FIGURES 1 to 5 are applied to this modified valve. It will be noted that the basic construction features of the valves to be described below are retained and that the assembly of the component elements in each of the succeeding valves to be described follows the teaching of the assembly of the valve shown in FIGURES 1 to 5, inclusive.

Thus, and in that embodiment of this invention as is illustrated in FIGURES 6 to 8, inclusive, the valve is assigned the general reference numeral 300 and is seen to include a main body portion 302 having elongated substantially cylindrical configuration with its longitudinal axis, in these figures, being shown as substantially vertical. From diametrically opposed sides of the main body portion 302 project the bosses 304, 306, respectively, all essentially as described above.

The main body portion 302 is provided with an internal axially extending centrally located bore 308 which opens at one end into the plane of its lower end 310. As is seen in FIGURES 6 and 7, this lower end is internally threaded at 312.

The upper end of the central bore 308 opens into the lower end of the coaxial counterbore 314, and the latter, at its upper end is in open communication with the lower end of the coaxially located cylindrical recess 316. The upper end of the latter is in open communication with the lower end of a coaxial cylindrical opening 318 which extends transversely through the upper end wall 320 formed integrally with the main body portion 302, the other end of the cylindrical opening 318 opening into the plane of the upper end 322 of the main body portion 302.

Disposed in the cylindrical recess 316 is an annular gasket 324 identical to the base member 62′ described above, and positioned in the counterbore 314 is an annular spacer member 326.

A traversing bore 328 extends axially through the boss 304, main body portion 302 and boss 306. As such, the bore 328 may be more closely defined as including a passage 328A opening at one end into the central bore 308 and having its other end extending axially through the boss 304 where it is internally threaded as at 330. The traversing bore 328 also includes the passage 328B which opens into the central bore 308 at one of its ends in diametrically opposed relation relative to the adjacent end of the passage 328A, the other end of the passage 328B extending axially through the boss 306 and being internally threaded as at 332.

Reference numerals 334 each denote an arcuate insert plate or seat, in general, each seat 334 being concave-convex in fonfiguration, and each seat has an arcuate length of less than 180°. The seats 334 are identical in configuration, one with respect to the other, and with respect to the seats 86 described above.

In this embodiment, the outer ends of one of the throats 336 engages the marginal edge of the iner end of the passage 328A with its O-ring seal 338 compressed against adjacent areas of the central bore 308, and the other of the throats 336 engages the marginal inner end of the passage 328B with its associated O-ring seal 338 compressed against adjacent areas of the central bore 308. The seats 334, at their respective upper ends, engage against the spacer 326 and are held in their respective circumferential positions by wedges 340, 342 identical in construction with respect to the wedges 108, 110, respectively. In this embodiment of the invention, the key 344 of the wedge 342 is slidably received in the keyway 346 which extends, as before, axially of the central bore 308 and opens therein.

The plug assembly, here designated by reference numeral 350 includes an elongated substantially cylindrical stem 352, as before, and The remaining components thereof are substantially identical to the plug assembly 130 in that this plug assembly 350 is formed with opposed ends 352A, 352B and intermediate its ends, the stem 352 is formed with an enlarged cylindrical shank 353 having a pair of axially extending laterally projecting diamerically opposed substantially rectangular and identical radial flanges 354 identical to the flanges 136. The stem 352, shank 353, and flanges 354 are bored perpendicular to the longitudinal axis of the stem 352 as at 356 with the radius of the bore 356 being greater than the distance between the edge 358, 360 of each of the flanges 354.

Again, and repeating the construction of the valve shown in FIGURES 1 to 5 inclusive, each of the flanges 354, on opposite sides of the bore 356, are formed with a bore 362 in which are seated, respectively, a rod 364 constructed from the same material as the rods 148. As is seen in FIGURE 6, the opposed ends of the rods 364 project beyond the adjacent edges 358, 360 of their respective associated flange 354.

Gates 368, identical in construction with respect to the gates 152, are provided for the shank 353. The concave-convex gates 368 each have an arcuate length of less than 180° and the concave sides 370 thereof fit flush against the shank 353. The upper ends of the gates 368 are coplaner with the upper end 353A of the shank 353, and the lower ends 374 of the gates 368 are coplaner with the lower end 353B of the shank 353. Each gate 368 is provided with an arcuate cutout 376 in their respective edges 378, 380, intermediate the upper and lower ends 372, 374, respectively, thereof.

As before, the cutouts 376 are placed into juxtaposition relative to the opening formed in the edges 358, 360 of the flange 354, the cutouts being struck on substantially the same radius as the bore 356 completes this bore through the flanges when the gates 368 are assembled on the stem 352. As before, and upon such assembly, the edges 378, 380 engage and compress therebetween the opposed ends of the rods 360.

Telescoped over the upper end 352A of the stem 352 is an annular gasket 382 identical with respect to the base member 62′ of the gasket assembly 60 described above. The outside diameter of this gasket 382 is less than the inside diameter of the spacer 326 to serve a function to be described. The underside 384 of the gasket 382 fits flush against and is supported upon the upper coplaner ends 353A and 372 of the shank 353 and gates 370, respectively. The stem 352 is further provided with a similar second gasket 386 having its upper side 388 fitting flush against the lower ends 353B and 374 of the shank 353 and gates 368, respectively.

The plug assembly 350 is telescoped in the seats 334, it being understood that with the plug assembly 350 turned to its open position as shown in FIGURES 6, 7 and 8, the bore 328 and the passage 356 are in open communication, one with the other.

The plug assembly 350 is retained in its operative position shown in FIGURES 6 and 7 by means of a cap structure 390 comprising an elongated substantially cylindrical main body portion 392 externally threaded adjacent one of its ends for threaded connection with the threads 312. The cap 396 is formed with an axial extending central bore 396 which opens, at one of its ends, into the upper end of a squared tool receiving recess 298, and the central bore 396, at its other end, opens into the lower end of the first counterbore 398. The upper end of the counterbore 398, in turn, opens into the lower end of a second counterbore 400, and the upper end of the latter opens into the plane of the upper end 402 of the cap 390. Disposed in the counterbore 398 is an annular gasket 404 having a construction identical with the annular gasket or seal 62 described in detail above.

As is seen in FIGURES 6 and 7, as the cap 390 is threaded into the lower end 310 of the main body portion 302, the inner end of the stem 352 enters the gasket 404 and is tightly surrounded thereby. When the cap has been fully threaded, the upper end of the gasket 404 bears tightly against the annular member 386 and the lower end of the stem 352 becomes rotatably journaled within the central bore 396, and the upper end 402 of the cap 390 bears against the lower ends of the seats 334.

With the valve 300 fully assembled, the upper end 352A of the stem 352 is extended through the annular member or seal 324 and is rotatably journaled in the opening 318. The upper end 352A of the stem 352 is also provided with a substantially rectangular and diametrically extending wrench head 406 which is adapted to be releasably engaged within a substantially rectangular transversely extending opening 408 of the wrench 410, the latter having lever receiving passages 412 extending therethrough with the axes thereof being contained in a plane substantially perpendicular to the longitudinal axis of the stem 352.

In the embodiment of FIGURES 6 to 8, inclusive, the annular element 382 is circumscribed by the spacer ring 326, and the latter element serves as a shoulder for the seats 334 while the wedges 340, 342 are being installed.

The operation of this valve is deemed to be obvious in view of the preceding specification relating to FIGURES 1 to 5, inclusive.

Figure 9:
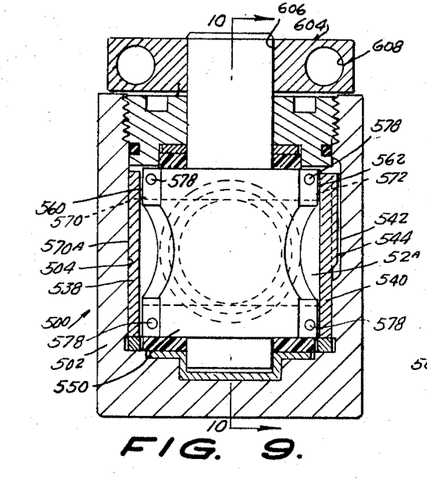
FIGURE 9 is a transverse cross-sectional view of a third embodiment of a plug valve constructed in accordance with this invention.
Figure 10:
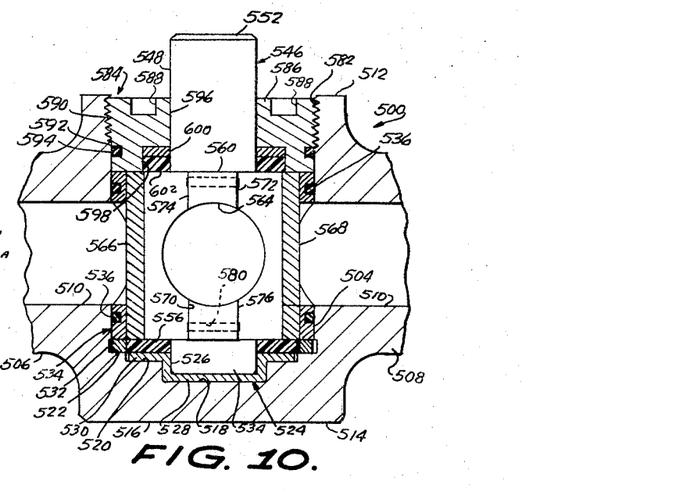
FIGURE 10 is a detail longitudinal cross-sectional view, FIGURE 10 being taken substantially on the vertical plane of line 10—10 of FIGURE 9, looking in the direction of the arrows.

FIGURES 9 and 10 illustrate a third embodiment of this invention wherein the valve 500 is seen to comprise a main body portion 502 having a vertically extending central bore 504 and a pair of opposed diverging bosses 506, 508, respectively, the bosses 506, 508 being integrally connected with the main body portion 502 and project radially away therefrom.

The bosses 506, 508 and main body portion 502 are traversed by a bore 510 which intersects the bore 504 intermediate its opposed ends. For identification purposes, the upper and lower ends of the main body portion have been assigned reference numerals 512, 514, respectively.

The lower end 514 is closed by an end wall 516 which is bored from its upper or inner side to form a seat 518, the upper end of the seat 518 opening into the lower end of the counterbore 520 and the upper end of the latter opening into the lower end of a further counterbore 522. The upper end of the counterbore 522 is in open communication with the lower end of the central bore 504.

A substantially hollow cylindrical bushing 524 having a sidewall 526 and a lower end wall 528 is fitted into the seat 518, and the upper open end of the sidewall 526 is provided with an outwardly flaring circumferential flange 530 which is seated in the counterbore 520. A spacer ring 532 is located in the counterbore 522 and serves as a support or mount for a pair of concave-convex seats 534 disposed in the central bore 504. The seats 534 are constructed in the same manner as described above, each having an arcuate length of less than 180°, and each of these seats carry the same O-ring seals 536 to which reference has previously been made. The seats 534 are held wedged in the central bore 504 by the wedges 538, 540, the wedge 540 having a key 542 projecting laterally therefrom and slidably received in the keyway 544 formed in the main body portion 502 and which opens into the central bore 504, all as has been described above.

The plug assembly 546 includes an axially elongated stem 548 having an enlarged shank 550 intermediate the opposed upper and lower ends 552, 554 thereof, respectively. The lower end 554 of the stem 548 is journaled for rotation in the bushing 524, and surrounding this lower end 544 is an annular plastic seal 556 having its planar underside flush with the planar upper side of the flange 530. The seal 556 is also disposed in the counterbore 522 and is in concentric relation relative to the spacer 532.

The lower end 558 of the shank 550 is seated on the seal 556, and the shank 550 is provided with the usual diametrically opposed radially projecting substantially rectangular and axially extending flanges 560, 562, the flanges 560, 562, shank 550 and stem 548 being transversely bored at 564 on an axis perpendicular to the longitudinal axis of the stem. The usual arcuate gates 566, 568, each having an arcuate length of less than 180° are provided, the gates 566, 568 having their respective adjacent edges 570, 572 positioned opposite the edges 574, 576 of the flanges 560, 562. The edges 570, 572 engage and seal against the opposed ends of the resilient compressible rods 578 carried in the bores 580 formed in the flanges 560, 562 on opposite sides of the bore 564, all is described heretofore. The edges 570, 572 are, as before, provided with cutouts 570A, 572A complementing the bore 564.

The upper ends of the shank 550 and the gates 566, 568 are coplanar, as in the previous embodiments, and as is seen in FIGURE 9 and 10, the upper end 552 of the shank 548 projects above the upper end 512 of the main body portion 502, the upper end 512 being internally threaded as at 582.

Reference numeral 584 denotes a cylindrical cap having a main body portion 586 in the upper and outer end of which are formed inwardly extending tool receiving sockets 588. The cap 584 is externally threaded as at 570 for threaded connection with the threads 582, and adjacent the opposed or inner end of the cap 584 the main body portion is circumferentially grooved to provide a seat 592 for an O-ring seal 594.

The cap 584 is coaxially bored at 596 and counterbored at 598, and seated in the counterbore 598 is an annular thrust member 600 on which is superimposed an annular plastic gasket or seal 602. As is seen in FIGURES 9 and 10, the upper end 552 of the stem 548 is received through the bore 596, the annular thrust member 600 and adjacent annular gasket 602.

In this assembly and construction it will be noted that the annular gaskets 556, 602 overlap both the shank 550 and gates 566, 568 and that the upper ends of the coplanar gates 566 and seats 534 have bearing engagement with the lower inner end of the main body portion 586.

The upper end 552 of the stem 548 is suitably formed to receive a wrench 604 thereover, the wrench 604 having a transverse opening 606 therethrough receiving the end 552, and the wrench is also formed with lever-receiving openings 608, all in the manner heretofore described.

Since the operation of this valve in no way departs from the operation of the valves of the preceding embodiments of this invention, no further elaboration thereon is deemed to be required.

Figure 11:
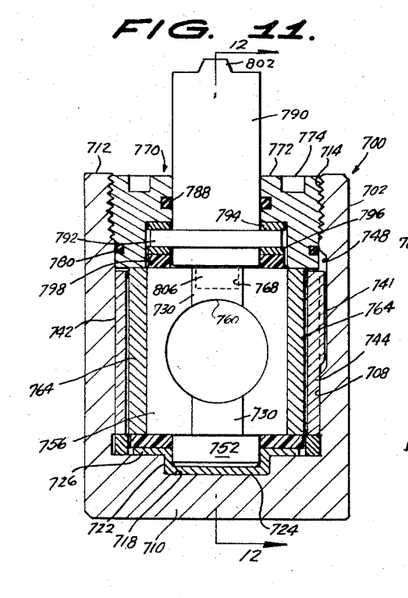
FIGURE 11 is a detail medial transverse cross-sectional view illustrating a forth embodiment of a plug valve constructed in accordance with this invention.
Figure 12:
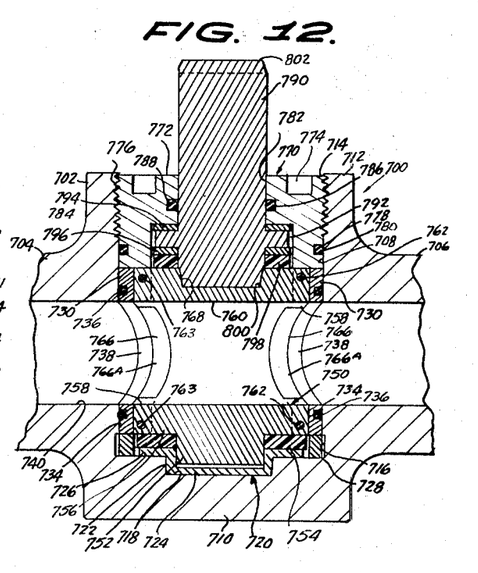
FIGURE 12 is a detail longitudinal cross-sectional view, FIGURE 12 being taken substantially on the vertical plane of line 12—12 of FIGURE 11, looking in the direction of the arrows.

The final embodiment of the invention herein shown and described is illustrated in FIGURES 11 and 12. In these figures, reference numeral 700 designates the valve in general, and the valve 700 is seen again to include a vertically elongated substantially cylindrical main body portion 702 from which laterally project, at diametrically opposed sides thereof, the bosses 704, 706, respectively. The main body portion 702 is provided with a vertically extending central bore 708 which, at its lower end, is closed by an end wall 710.

The central bore 708 is internally threaded at its upper end 712 as at 714, and at its lower end the central bore 708 opens into the upper end of the counterbore 716. The lower end of the counterbore 716 is in open communication with the upper end of the bore 718 of reduced diameter, and seated in the bore 718 is a hollow cylindrical bushing 720 having a sidewall 722 and an end wall 724 extending transversely thereacross. The sidewall 722 terminates at its exposed upper end in an outwardly flaring circumferential flange 726 disposed in the counterbore 716, the flange 726 being concentric and spaced inwardly from an annular spacer member 728 also disposed in the counterbore 716.

Supported on the spacer member 728 are the lower ends of the pair of arcuate seats 730, these seats being constructed in the manner of the gates described above, and as is customary, each seat 730 has an arcuate length of less than 180°. The seats 730 are disposed in the central bore 708 with their convex faces bearing against the adjacent side thereof, and these faces each carry, as in all of the above embodiments, a throat 734 circumscribed by O-ring seal 736. The throats 734 have the usual passages 738 formed therein and which extend transversely therethrough, the passages 738 being aligned with a traversing bore 740 when the valve 700 is open. The traversing bore 740 extends through the bosses 704, 706, the main body portion 702 and intersects the central bore 708, all in the manner heretofore described. The seats are wedged in their respective positions by the usual wedges 742, 744, the latter being provided with a key 746 slidably received in the keyway 748 formed in the main body portion 702 and opening into the central bore 708.

The plug assembly 750 of the valve 700 includes a lower stem 752 journaled for rotation in the bushing 720 and over which is mounted an annular gasket or seal 754 that lies flush, at one side thereof, with the adjacent side of the flange 726, and this gasket 754 is also received within the counterbore 716. The gasket 754, at its opposed side, fits flush against the adjacent end of an enlarged cylindrical shank 756, the shank 756 being integrally formed with the stem 752, and the gasket 754 also fits flush against the adjacent coplanar ends of the pair of diametrically opposed axially elongated substantially rectangular flanges 758 integrally formed with the shank 756 and projecting radially therefrom, all in the manner described above. The stem 752, shank 756 and flanges 758 are bored at 760, all as described above, and each flange 758, at opposite sides of the bore 760 is horizontally bored as at 762 to receive the cylindrical rods 763, the latter having been described in detail above.

Gates 764, of arcuate configuration and having an arcuate length of less than 180° are mounted on the shank 756, the gates having edges 766 which abut the opposed ends of the rods 763, and these edges are also provided with cutouts 766A intermediate their opposed ends, the cutouts 766A matching the bore 760, all as has been described.

The upper ends of the seats 730, the flanges 758 and shank 756 are coplanar, as is the preceding described embodiments, and the upper end of the shank 756 is provided with a trapezoidal opening 768 to serve a function to be described.

Reference numeral 770 indicates a cylindrical cap having a main body portion 772 in which are formed downwardly extending wrench-receiving recesses 774. The cap 770 is externally threaded at 776 adjacent its upper end for threaded connection with the thread 714. The cap 770, adjacent its lower end, is circumferentially grooved as at 778 to receive an O-ring seal 780, and the cap 770 is bored and counterbored at 782, 784, respectively, to serve functions to be described, and as is seen in FIGURES 11 and 12, the main body portion 772 is formed with an inner circumferential groove 786 which opens into the bore 782 and which serves as a seat for an O-ring seal 788.

Journaled for rotation in the bore 782 and having a lower end extending through the counterbore 784 is an upper stem 790 having a circumferential flange 792 formed integral therewith adjacent its lower end and normally disposed in the counterbore 784.

Mounted on the upper stem 790 and located on opposite sides of the flange 792 are annular thrust members 794, 796 also disposed in the counterbore 784. The lower end of the stem 790 also carries an annular gasket or seal 798 superimposed against the member 796 and being received with the counterbore 784. Projecting beyond the gasket 798 and integral with the lower end of the stem 790 is a trapezoidal tongue 800 which is adapted for releasable engagement within the opening 768.

The lower end of the valve cap 770 when assembled as shown, engages and spans the upper ends of the gates 730 and an adjacent end portion of the shank 756 and its flanges 758. The underside of the annular gasket 798 lies flush against the upper end of the shank 756. The upper end of the upper stem 790 terminates in a diametrically extending tongue 802.

The upper stem 790 is adapted to receive any conventional tool (not shown thereon) to effect operation of the valve 700.

Having described and illustrated a number of embodiments of this invention, it will be understood that the same art offered merely by way of example, and this invention is to be limited only by the scope of the appended claims.

I claim:
1. A fluid control valve comprising a main body portion having a central cylindrical bore and a traversing bore intersecting said central bore and forming inlet and outlet openings at, respectively, a pair of sides of said main body portion, a plug assembly including a substantially cylindrical stem disposed in said central bore coaxially therewith, said stem having a bore extending transversely therethrough and gate means mounted thereon having fluid passage means formed therein aligned with said bore of said stem, said stem being rotatable in said central bore to move its said bore and said fluid passage means of said gate means into and out of alignment with said traversing bore to control the fluid flow through said valve, and wherein:
   (a) said gate means comprises a pair of concave-convex plates substantially circumscribing said stem; and,
   (b) means on said stem connecting said plates thereto for rotation therewith.
2. A fluid control valve as defined in claim 1:
   (a) said gate means comprises a pair of concave-convex plates embracing said stem, each of said plates having an arcuate length of less than 180° and having its respective pair of edges confronting a corresponding pair of edges on the other of said plates; and,
   (b) means on said stem interposed between each confronting pair of edges and engageable therewith to connect said plates with said stem for simultaneous rotation therewith.
3. A fluid control valve as defined in claim 1:
   (a) said gate means comprising a pair of concave-convex plates each having a length of less than 180° and having a pair of edges confronting a pair of edges on the other of said plates; and,
   (b) means including sealing means on said stem interposed between each confronting pair of edges connecting said plates on said stem for rotation therewith.
4. A fluid control valve as defined in claim 2 wherein:
   (a) said last-named means comprises a flange extending from said stem.
5. A fluid control valve as defined in claim 2 wherein:
   (a) said last-named means comprises a flange extending from said stem; and
   (b) sealing means projecting laterally from each of said flanges and engaging the adjacent one of said edges.
6. A fluid control valve as defined in claim 2 wherein:
   (a) said last-named means comprises a flange extending from said stem, said bore of said stem extending through said flanges, and sealing means mounted on each flange to effect said engagement and connection of said plates with said stem.
7. A fluid control valve as defined in claim 6 wherein:
   (a) said bore of said stem and flanges opens into a pair of opposed edges of each of said flanges; and,
   (b) each edge of said confronting pairs of edges of said plates includes an arcuate cutout disposed in juxtaposition relative to said opposed edges of said flanges, said cutouts each being struck on the same radius as said last named bore and complementing the same to effect a continuous bore of substantially uniform transverse cross-section throughout said stem and its said flanges.
8. A fluid control valve as defined in claim 7 wherein:
   (a) said flanges each are provided with seat means on opposite sides of said last named bore; and,

(b) said sealing means is disposed in each one of said seats and projects beyond the adjacent edge of its associated flange.

9. A fluid control valve as defined in claim 8 wherein:
(a) said seat means comprises a bore having opposed ends opening into the opposed edges of its associated flange; and,
(b) said sealing means comprises a rod of compressible material disposed in each of said bores and having ends projecting beyond said edges of its associated flange to effect said engagement and connection with said stem.

10. A fluid control valve as defined in claim 9, wherein:
(a) said main body portion further includes closure means extending transversely across one end of said central bore and a removable closure cap closing the opposed end of said central bore; and,
(b) said stem includes a pair of opposed ends each journalled for rotation in, respectively, said closure means and said cap.

11. A fluid control valve as defined in claim 10 wherein:
(a) said stem includes an enlarged cylindrical shank with said bore of said stem extending therethrough; and
(b) annular sealing means mounted on each end of said stem and clampingly engaged between the opposed ends of said shank and adjacent portions of said closure means and said closure cap.

12. A fluid control valve as defined in claim 9 wherein:
(a) said main body portion further includes an end closure wall extending transversely across one end of said central bore, said closure wall having an opening extending transversely therethrough coaxially aligned with said central bore;
(b) said main body portion having a coaxial counterbore formed therein intermediate said central bore and said opening and having opposed ends opening into said adjacent ends thereof;
(c) a first annular gasket disposed in said counterbore, said gasket having a concentric shoulder formed thereon extending inwardly of said main body portion;
(d) said main body portion having a second coaxial counterbore formed therein and in open communication with the other end of said central bore;
(e) a second annular gasket disposed in said counterbore, said last-named annular gasket having a concentric shoulder formed thereon facing inwardly of said main body portion;
(f) a removable closure cap disposed in said second counterbore and having an opening formed therein coaxially aligned with said second counterbore;
(g) and wherein said stem includes an enlarged cylindrical shank disposed intermediate the ends thereof with said bore of said stem extending therethrough;
(h) said ends of said stem being journalled, respectively, for rotation in said opening formed in said closure wall and said opening formed in said cap and extending through the adjacent ones of said gaskets; and
(i) an annular thrust member mounted on each end, respectively, of said stem, said thrust members being interposed between each said shoulder and the adjacent end of said shank.

13. A fluid control valve as defined in claim 12 wherein said valve further includes:
(a) seat means disposed in said valve, said seat means being positioned in said central bore intermediate said main body portion and said gates, said seats each having a passageway formed therein coaxially aligned with said traversing bore.

14. A fluid control valve as defined in claim 13 wherein:
(a) said seat means comprises a pair of arcuate plates each having a length of less than 180° with the edges of one plate confronting the edges of the other of said plates, and wedges means removably inserted between each confronting pair of edges of said plates.

15. A fluid control valve as defined in claim 9 wherein:
(a) said main body portion further includes closure means extending transversely across one end of said central bore and a removable closure cap closing the opposed end of said central bore;
(b) bushing means disposed on said closure means and opening into said central bore;
(c) said stem including a pair of opposed ends and an enlarged shank intermediate the ends of said stem, said stem having one of its ends journalled for rotation in said bushing means;
(d) said main body portion having a counterbore adjacent said bushing means;
(e) a sealing gasket mounted on said one end of said stem and disposed in said counterbore between said bushing and the adjacent end of said shank;
(f) an annular spacer member for said valve seat means, said spacer member being disposed in said counterbore in concentric relation relative to said sealing gasket;
(g) said cap having a closed end and an opening extending transversely therethrough in open communication with one end of a counterbore formed in said cap;
(h) the other end of said stem being journalled for rotation within said last-named opening and extending through said counterbore;
(i) an annular thrust member mounted on said other end of said stem and disposed in said last-named counterbore; and
(j) an annular sealing gasket mounted on said other end of said stem and disposed in said last-named counterbore intermediate said last-named thrust member and the adjacent end of said shank.

16. A fluid control valve as defined in claim 15 wherein:
(a) and releasable connecting means connecting the other end of said stem with the adjacent end of said shank.

17. In a fluid plug valve having a main body portion and a central bore formed therein, said main body portion having a traversing bore extending therethrough intersecting said central bore and forming inlet and outlet sides of said valve, a valve plug disposed in said central bore to control the fluid flow through said valve, and seat means disposed in said central bore intermediate said plug and said inlet and outlet sides of said valve, and wherein:
(a) said seat means comprises a pair of arcuate insert plates each having an arcuate length of less than 180°, said seat means each having a passageway extending transversely therethrough for alignment with said traversing bore;
(b) said plates being disposed in said central bore with the edges of one of said plates confronting the edges of the other of said plates; and
(c) means interposed between each confronting pair of edges of said plates to connect said plates as a unit and thereby prevent said plates from turning about their respective longitudinal axis.

18. In a fluid plug valve as defined in claim 17 wherein:
(a) said last-named means comprises wedge means removably disposed between each adjacent pair of confronting edges of said seats.

19. In a fluid plug valve as defined in Claim 18 wherein:
(a) said main body portion is provided with a keyway extending axially of said central bore, said keyway opening into said central bore; and (b) one of said wedge means is provided with a laterally projecting key releasably received within said keyway.

20. In a fluid valve as defined in claim 19 wherein:
(a) each of said plates is provided with an annular channel to define a throat thereon,
(b) said passageway of each of said plates extending transversely through said throat; and
(c) an annular sea disposed in each of said channels for engagement against the adjacent side of said central bore.

References Cited
UNITED STATES PATENTS

| | | | |
|---|---|---|---|
| 2,813,695 | 11/1957 | Stogner | 251—159 |
| 2,844,353 | 7/1958 | Gurries | 251—175 |
| 2,845,248 | 7/1958 | Fuglie | 251—175 |
| 3,239,190 | 3/1966 | Mayo | 251—175 |

LEONARD D. CHRISTIAN, *Primary Examiner.*

U.S. Cl. R.X.

251—283, 314.